May 31, 1960   A. NIELSEN   2,938,464
AIR CHARGER
Filed July 2, 1957
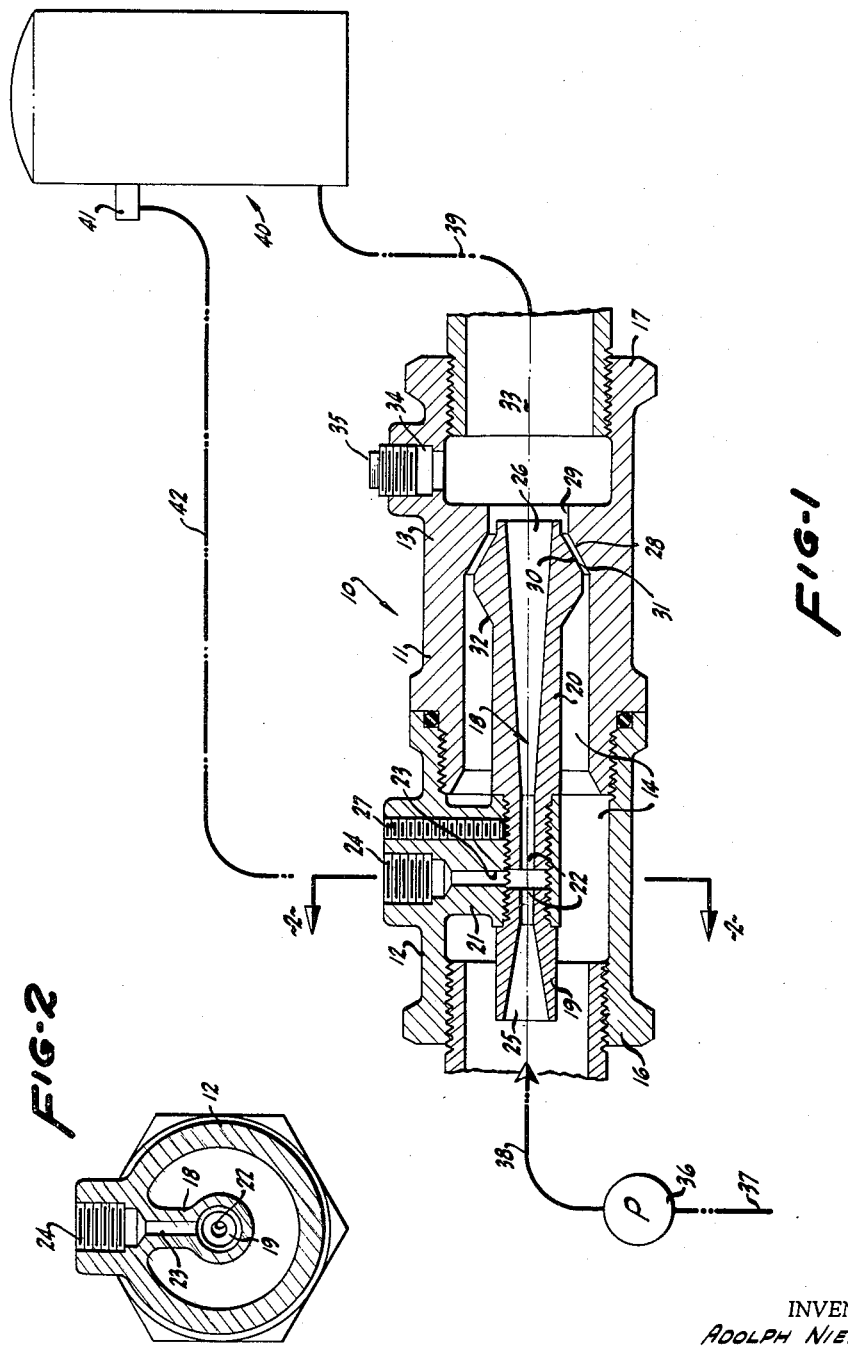
INVENTOR.
ADOLPH NIELSEN
BY
Meelin and Hanscom
ATTORNEYS

United States Patent Office

2,938,464
Patented May 31, 1960

---

2,938,464
AIR CHARGER

Adolph Nielsen, Oakland, Calif., assignor to Nielsen Mfg. Co., Oakland, Calif., a corporation of California Filed July 2, 1957, Ser. No. 669,674

2 Claims. (Cl. 103—6)

My invention relates to air chargers, and, more particularly, to air chargers employing a venturi action to introduce air into the fluid passing through the air charger.

In a pump and tank water pressure system, pressure is normally maintained by an air cushion in a closed pressure tank. In a conventional system of this type, the water within such a tank gradually absorbs air from the air cushion and the amount of water which can be removed from a given size tank at a given pressure range is thus greatly reduced. This loss of air cushion is commonly referred to as "water logging" of the tank. To relieve this condition, air charging devices have been employed to replenish the air within the tank by injecting air into the water as it is pumped to the tank. Such air charging devices normally employ a venturi tube so that a portion of the water passing through the air charger will be forced through the venturi tube to draw in air. To be effective, the venturi passage must be quite small in cross section at its throat, and, consequently, the venturi passage must be bypassed by most of the water passing through the air charger if the tank is to be filled in a practicable length of time. However, if the venturi passage is bypassed, then, in the filling of the tank, little water will be forced through the venturi, and, consequently, little air will be drawn into the water. Prior efforts to overcome this problem have resulted in air injectors having the bypass flow restricted by spring biased valve members so that all of the water is initially forced through the venturi until the pressure of the incoming water exceeds the biasing of the bypass valve member, the flow then occurring both through the venturi and the bypass valve. If it is desired to backflow the tank; i.e., to draw the service water from the bank back through the air charger to point of use, then another valve must be provided to allow such water to bypass the venturi passage in the other direction.

By means of the present invention, an air charger has been devised which will allow a large volume of water to flow through the charger at all times, and in either direction, while yet providing for sufficient water to be forced through the venturi passage to draw air into the water passing through the charger. Applicant has accomplished this by utilizing the flow of the major portion of the water by venturi action to induce a flow of water through the conventional venturi so that the air charger has a double venturi action to draw the air into the water. By the present invention, all springs, valves and other moving parts are eliminated, without the elimination of their functions.

It is an object of this invention to provide an air charger adapted to draw air into the fluid passing through the charger by a double, or compound, venturi action.

It is a further object of this invention to provide a housing having a first venturi flow passage therein, a second venturi passage coaxial therewith and having its discharge within the throat of the first venturi, and an air passage through the housing into the throat of the second venturi.

Another object of the invention is to provide a cylindrical housing having a restricted throat, a venturi passage mounted within the housing and having its discharge within the restricted throat of the housing, and an air passage through the housing into the throat of the venturi passage.

Other objects and advantages will become apparent in the following detailed description.

In the accompanying drawings, forming a part of this application, and in which like parts are designated by like reference numerals throughout the same, Fig. 1 is a sectional view of an air charger constructed in accordance with the invention, with parts shown in elevation, and a system shown schematically in which the air charger may be used.

Fig. 2 is a sectional view of the air charger taken on the line 2—2 of Fig. 1.

Referring now to the drawings, wherein is shown a preferred embodiment of the invention, the air charger, designated in general by the reference numeral 10, comprises a housing 11 made up of two tubular sections 12 and 13 having a flow passage 14 therethrough. The inlet and outlet ends 16 and 17 of the housing are preferably threaded for connection into a pipe line. A venturi passage 18 is formed coaxial with flow passage by tubular venturi members 19 and 20 mounted in an end-to-end relation in an internal boss 21 formed in the tubular section 12, the venturi members having a restricted throat portion 22 within the boss in communication with an air inlet passage 23 formed through the boss to a threaded inlet 24. The venturi members are flared outwardly from the restricted throat 22 to form a venturi inlet 25 and venturi outlet 26, respectively. A setscrew 27 may be employed to retain the venturi member 20 in place.

The flow passage 14 within the tubular section 13 is tapered inwardly at 28 to form a restricted throat 29, the discharge end of venturi member 20 being disposed within the restricted throat 29 of the flow passage. The end of the venturi member 20 is radially enlarged so as to provide a tapered surface 30 thereon cooperating with the tapered portion 28 of the tubular section 11 to form a tapered annular passage 31 therebetween. The radially enlarged portion of the venturi member tapers back to the body of the venturi member at 32 so as to reduce the turbulence of the fluid flowing past the radial enlargement.

The restricted throat 29 discharges into the outlet chamber 33 in the outlet end 17 of the housing member. A radial port 34 closed by plug 35 is provided in the outlet chamber to enable a pressure gauge (not shown) to be connected thereto, if desired.

One use, for which the air charger is particularly adapted, is that of a typical pump pressure system, wherein a pump 36, having an inlet 37 disposed in a well, pumps water under pressure through line 38 into the inlet of the air charger. The outlet of the air charger is connected by line 39 to a closed tank 40. An air control valve 41 admits air into the line 42, which connects to the air inlet 24 of the air charger; the control valve selectively admitting air from the tank or atmosphere into line in accordance with the height of the water within tank, as is well known in the art.

As water is pumped through the air charger, the greatest flow will occur around the venturi members 19 and 20, as the effective discharge area of the annular passage 31 is considerably greater than that of the venturi passage 18. In passing through the annular passage, the velocity of the water will be greatly increased, and the stream will be directed inwardly upon itself, due to the tapering of the passage, so that the stream will converge upon itself as it passes through the throat 29 into the outlet chamber 33.

This high velocity converging water stream creates a region of low pressure at the outlet of the venturi member 20 so that the pressure at that point is considerably less than the pressure at the inlet 25 of the venturi, to increase the flow through the venturi passage 18 and to increase the amount of air drawn into the water passage 23.

Thus, the present air charger has a double venturi effect, with the main water flow through passage 14 serving to boost the water flow through the small venturi passage 18 and to create a very high velocity of the water in the venturi throat 22. This boosting effect of the venturi action of the main water flow eliminates the necessity for initially forcing all of the water through the venturi passage 18, and thus eliminates the necessity for providing bypass valves around the air injecting venturi. The present air charger is extremely dependable in use, as there are no moving parts to get out of order, and the high velocity of the water through the venturi throat 18 produces a higher degree of air injection per volume of water passing through the air charger 10 than heretofore possible.

The air charger is not limited in use to that of the pump pressure system illustrated. For example, the air charger might be used as a foam nozzle in fire fighting equipment, or any other such use, where it is desired to inject one fluid into a second fluid by the suction created by the second fluid passing through the device.

It is to be understood that the form of the invention herewith shown and described is to be taken as a preferred embodiment of the same, and that various changes in the shape, size and arrangement of parts may be resorted to without departing from the spirit of the invention or the scope of the attached claims.

Having thus described my invention, what I claim and desire to secure by Letters Patent is:

1. Apparatus of the character described comprising an elongated housing member having a main flow passage therethrough provided with inlet and outlet ends, a closed water storage tank connected to said outlet end, a pipe line connected to the inlet of said main flow passage, a pump connected in said pipe line, said main flow passage being annularly converged near its outlet end to form a restricted throat portion therein, a tube mounted within said main flow passage upstream of said restricted throat portion and coaxially therewith, said tube having the outer wall thereof spaced from the wall of said main flow passage to form an annular flow path therebetween and having the discharge end thereof terminating within said restricted throat portion, said tube having a venturi-shaped passage therethrough with a restricted throat portion coaxial with said main flow passage, said tube having the outer wall thereof radially enlarged adjacent the discharge end to form with said housing an annular passage therebetween converging inwardly towards the discharge end of said tube, said radially enlarged outer tube wall then tapering inwardly away from said discharge end of said tube, and means forming an air inlet passage from the exterior of said housing member through said housing member and through said tube to the restricted throat portion of said venturi-shaped tube passage.

2. Apparatus of the character described comprising pump means for pumping water, a closed water storage tank, a conduit connecting the discharge side of said pump means to said tank, means forming a first restricted-throat venturi in said conduit with the discharge side of said venturi directed towards said tank, means forming a second restricted-throat venturi completely within said conduit with the discharge side of said second venturi terminating at the throat of said first venturi, and means forming an air injecting passage through said conduit and opening into the throat of said second venturi.

References Cited in the file of this patent

UNITED STATES PATENTS

| | | |
|---|---|---|
| 1,005,288 | O'Leary | Oct. 10, 1911 |
| 1,267,897 | Pagel | May 28, 1918 |
| 2,025,577 | Diehl | Dec. 24, 1935 |
| 2,283,907 | Berman | May 26, 1942 |
| 2,293,632 | Sauer | Aug. 18, 1942 |
| 2,332,694 | Cambell | Oct. 26, 1943 |
| 2,622,531 | Brady | Dec. 23, 1952 |

FOREIGN PATENTS

| | | |
|---|---|---|
| 423,705 | Italy | July 23, 1947 |
| 475,813 | Italy | Nov. 19, 1952 |